United States Patent [19]

Guertin

[11] 4,319,652

[45] Mar. 16, 1982

[54] WEIGH SCALE

[76] Inventor: Joseph R. Guertin, 4651 Vanguard Rd., Richmond, British Columbia, Canada, V6X 2P7

[21] Appl. No.: 176,916

[22] Filed: Aug. 11, 1980

[51] Int. Cl.³ .................... G01G 21/12; G01G 23/02
[52] U.S. Cl. .................................. 177/255; 177/154
[58] Field of Search ...................... 177/154, 156, 255

[56] References Cited

U.S. PATENT DOCUMENTS 3,158,217  11/1964  Johnson ........................ 177/154 X Primary Examiner—George H. Miller, Jr.
Attorney, Agent, or Firm—Smyth, Pavitt, Siegemund & Martella

[57] ABSTRACT

A weigh scale has a load receiving deck. Load cells support the deck during weighing. A frame, below the load receiving deck carries the load cells. There are housings formed on the deck or the frame. A retractable extension on the other of the deck and the frame is positioned to extend into each housing to prevent, when the extensions are engaged in the housing, relative lateral movement of the deck and the first frame.

8 Claims, 8 Drawing Figures

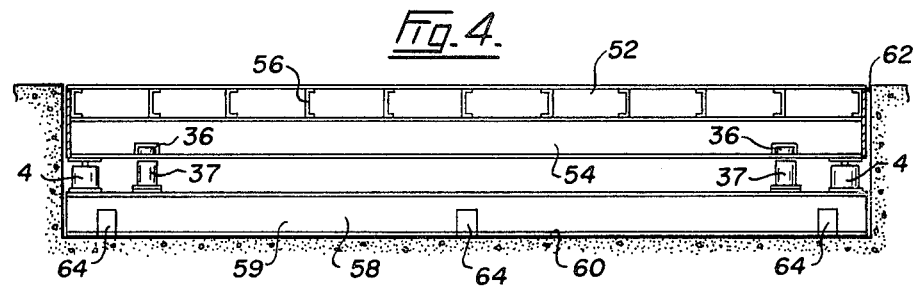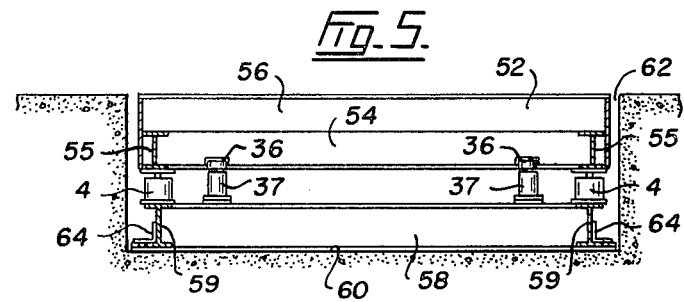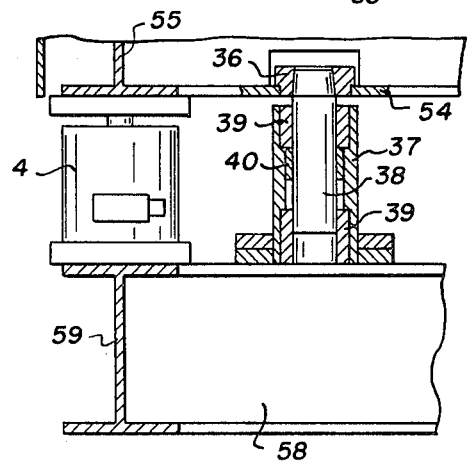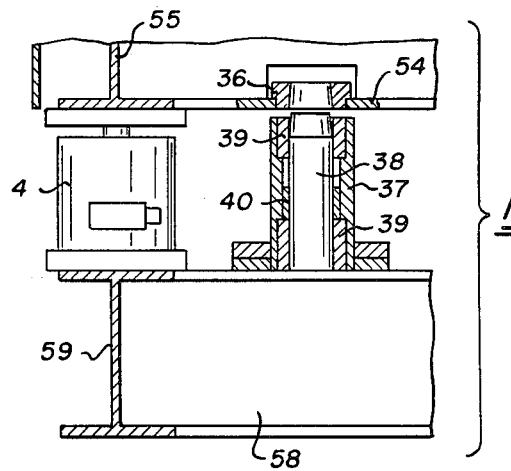

WEIGH SCALE

FIELD OF THE INVENTION

This invention relates to a weigh scale.

DESCRIPTION OF THE PRIOR ART

Generally industrial weigh scales are in three main groups. First there are lever scales in which the load is sensed by a system of levers. Secondly there is a type of scale, generally smaller scales, in which load cells and levers combine to sense the load. The third type is where the load is sensed exclusively by load cells and it is to this type of scale to which the present invention principally relates.

Generally load cell scales comprise a load receiving deck with load cells to support the deck during weighing. Typically there is a first frame below the load receiving deck to carry the load cells. But the structure beneath that will vary. For example a scissor lift platform has pivotally connected members to raise and lower the load receiving deck. Other scales are mounted in a pit so that, for example, a load can be driven onto them.

It is important that load cell scales be stabilized to resist the forces applied to them during loading. Indeed the operation of a scale can be divided into two clear modes of operation. The first mode is a material handling mode which is when the load to be weighed is either placed on the scale or removed from the scale. The second mode of operation is the weighing mode in which the actual weighing is carried out.

It is important that during the material handling mode the scale be stabilized if consistent, accurate weighing is to be achieved in the weighing mode. This stabilization is a means of maintaining the relative positions of the load receiving deck to the base.

A well known method of avoiding the disadvantages and inaccuracies in weighing resulting from the loading is the use of check rods. A rod, for example ⅜th inches in diameter, is rigidly attached at one of its ends to the base frame and rigidly attached at the other of its ends to the top frame. The invention is that any loading of the cell induces tension in the check rods which resists distortion of the parts of the scale.

The known system using check rods works well provided that the loading is in the longitudinal direction of the check rods so that any force applied to the check rods puts them in tension. The system does not work well when the force tends to put the check rods in compression, for example where the scale is loaded in a manner not intended or envisaged by the designer. However, the loading of scales from any direction is clearly desirable and, in any event, is common for example in large airport scales where containers are fed on from all angles. The proper maintaining of the relative positions of the components of the scale during loading without inducing extraneous force is a constant problem in these circumstances to which no satisfactory solution has yet been evolved.

SUMMARY OF THE INVENTION

The present invention provides a solution to the above problem by providing a system that resists distortion of the components of the scale regardless of the direction of loading of the scale. Furthermore the system is such that during the actual weighing operation it does not in any way interfere with the weighing, which could not always be said of the check rod system.

Accordingly, in a first aspect, the present invention is a weigh scale comprising a load receiving deck; load cells to support the deck at least during weighing; a first frame, below the load receiving deck, and carrying the load cells; a plurality of housings formed on one of said deck and said first frame; a plurality of rectractable extensions on the other of said deck and said first frame, each extension positioned to extend into a housing to prevent, when the extensions are engaged in the housings, relative movement of the deck and the first frame.

Typically the retractable extensions are double acting cylinders, for example hydraulic cylinders.

The invention of the present application is applicable to a scissor lift platform scale and to an electronic floor scale, the latter typically being mounted in a pit.

BRIEF DESCRIPTION OF THE DRAWINGS

Aspects of the invention are illustrated, by way of example, in the accompanying drawings in which:

FIG. 4 is a side elevation of an electronic floor scale according to the present invention;

FIG. 5 is an end view of the scale of FIG. 4; and

FIGS. 6A and 6B illustrate details of the scale of FIGS. 4 and 5.

DESCRIPTION OF THE PREFERRED EMBODIMENTS

Figure 1:
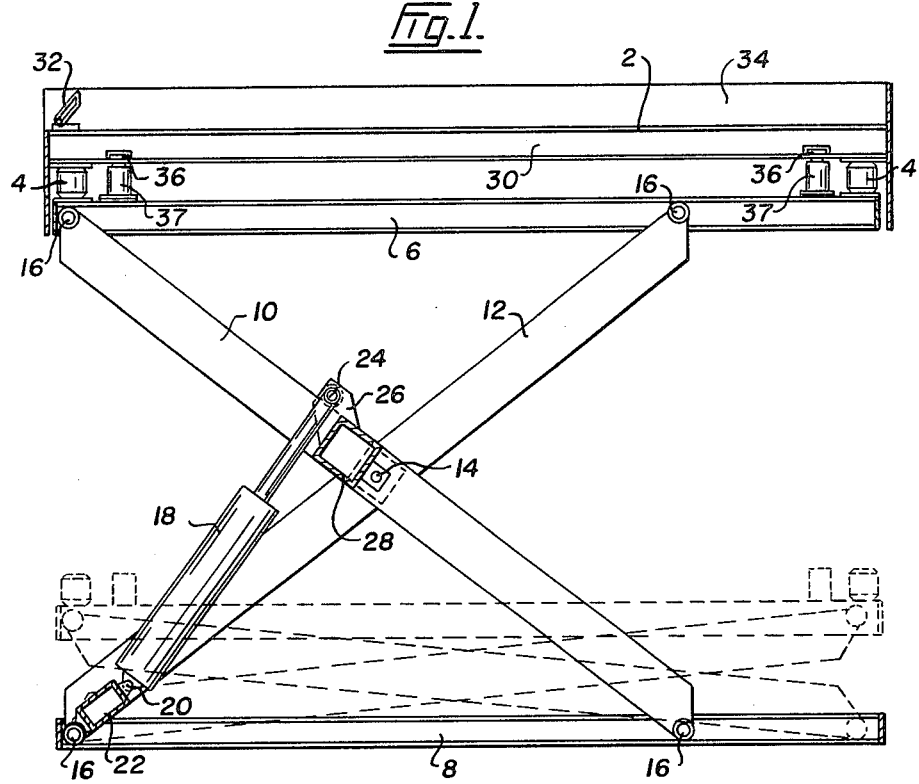
FIG. 1 is a sectional side elevation of a hydraulic scissor lift platform incorporating the present invention.

Referring to the drawings FIG. 1 shows a scissor lift platform comprising a load receiving deck 2. There are load cells 4 to carry the deck 2. A top frame 6 carries the load cells 4. A base member 8 is the means of mounting the scissor lift to a stable floor or base. There are scissor members 10 and 12 at each side of the scales pivotally attached to each other by a pivot pin 14. Members 10 and 12 are pivotally attached to the top frame 6 and the base member 8 through pivot pins 16. Single acting cylinders 18, typically hydraulic, are each located at one end by a pivotal attachment 20 to a cross member 22 extending between the two scissor members 12. At its other end each hydraulic cylinder 18 is pivotally attached at 24 to an arm 26 extending to a cross member 28 extending between the scissor members 10.

The structure described so far is conventional. The load receiving deck is constructed of steel girders 30 and cross beams. The load receiving deck 2 may again, as is conventional, include a top conveyor of ommidirectional or bidirectional rollers to move the load, for example containers or pallets. Pallet stops 32 and side fences 34 are used to contain the loads on deck 2.

In FIG. 1 the deck 2 is shown in raised, weighing position in solid lines and, in broken outline, in collapsed position. The scale is moved between the two positions by extension and retraction of the hydraulic cylinders 18 in known matter.

Figure 2:
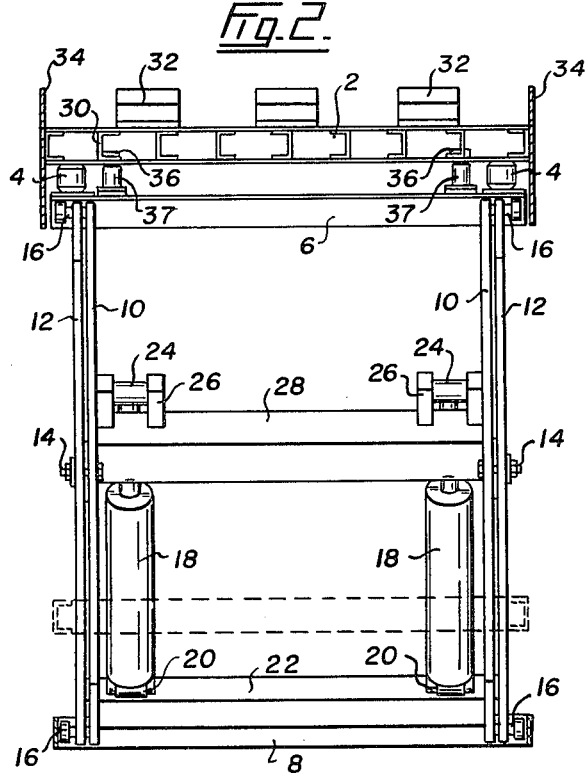
FIG. 2 is a sectional end view of the scale of FIG. 1.
Figure 3A:
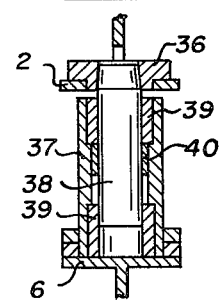
FIGS. 3A and 3B illustrate details of the stabilizing system of the scale of FIGS. 1 and 2.
Figure 3B:
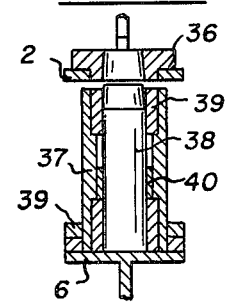

In the illustrated embodiment of FIGS. 1 to 3 there are a plurality of housings 36 formed in the load receiving deck 2. A corresponding plurality of hydraulic rams 37 with rods 38 are formed on the first frame 6. As particularly illustrated in FIGS. 3A and 3B the rods 38 are aligned with the housings 36 to be moved in and out of the housings. FIG. 3A illustrates the loading position.

FIG. 3B illustrates the weighing position. Thus, when it is desired to load a scale of FIG. 1 the rods 38 are extended each into a housing 36 as shown in FIG. 3A. The arrangement is such that the load receiving deck 2 cannot move relative to the first frame 6 regardless of the direction of loading of the scale. When loading is completed the rods 38 are withdrawn as shown in FIG. 3b and the weighing can take place. That is when the rods 38 are withdrawn the load receiving deck 2 is carried entirely by the load cells 4 providing the greatest possible accuracy in weighing without interference from, for example, check rods.

The rams 37 are provided with low friction liners 39 and the rods 38 each have stop members 40 to abut the liners 39 to restrict the travel distance of the rods 38.

To avoid inaccuracy in weighing when the rods 38 are engaged in the housings 36 there is an interlocking circuit which blanks out the reading on the scale. In this regard the obtaining of a reading on the scale is conventional featuring, for example, a digital indicator. It is desired that a constant pressure push button be pressed continuously in order to obtain a weight reading. Such a reading will only occur when the rods 38 are free of the housings 36.

The cylinders are preferably double acting hydraulic cylinders positioned, like the load cells 4, one at each corner of the rectangular load receiving deck 2.

FIGS. 4 to 6 illustrate an electronic floor scale. Where parts are common to FIGS. 1 to 3 the same reference members are used. The structure of the scale is generally conventional, the essential features of the invention as applied to the scale being shown in FIGS. 6A and 6B. The electronic floor scale comprises a load receiving deck 52 with a top frame 54 below and secured to the load receiving deck 52. Typically the top frame 54 will be of longitudinal I-beams 55 and the load receiving deck 52 have a top surface mounted to the top frame 54 by C-section beams 56. There is a base frame 58 of I-beams 59 mounted on a base 60, which, in this case, is the base of a pit generally shown at 62. The arrangement is such that the upper surface of the load receiving deck 52 is generally level with the upper edge of pit 62 to facilitate loading of the scale.

The base frame 58 may be provided with reinforcing angle sections 64 to facilitate mounting of the base frame 58 on the base 60.

In a manner analogous to the embodiment of the invention illustrated in FIGS. 1 to 3 there are a plurality of housings 36 formed on the top frame 54. A plurality of rams 37 with rods 38 are formed on the upper surface of the base frame 58. Load cells 4 are mounted between the base frame 58 and the top frame 54 again as particularly illustrated in FIGS. 6A and 6B. The arrangement of the rods 38 in the housings 36 is such that, as shown in FIGS. 6A, complete stability of the load receiving deck 52 is achieved during loading but there is no interference by these members on the weighing operations once the rods 38 are retracted as shown in FIGS. 6B. The load receiving deck 52 is then carried entirely by the load cells 4.

In other respects the apparatus of FIGS. 4 to 6 resembles the apparatus of FIGS. 1 to 3. That is, the load cell arrangement, the use of potentiometers, and the use of an interlock electrical circuit to prevent obtaining a reading while the retractable members are engaged in the housings are used.

Thus the present invention provides a weigh scale in which weighing is carried out completely free of interference of stabilizing members required during loading. The stabilizing members, during loading, are such that they can resist forces in any direction but are disengaged during weighing and these cannot interfere with that operation.

I claim:

1. A weigh scale comprising a load receiving deck; load cells to support the deck during weighing;
   a first frame, below the load receiving deck, and carrying the load cells;
   a plurality of vertical housings formed on one of said deck and said first frame;
   a retractable extension on the other of said deck and said first frame, positioned to extend into each housing to prevent, when the extensions are engaged in the housing, relative horizontal movement of the deck and the first frame.

2. A weigh scale as claimed in claim 1 in which the load receiving deck and the first frame are of generally rectangular configuration with four load cells, four extensions and four housings positioned generally adjacent the corners of the rectangle.

3. A weigh scale as claimed in claim 1 in the form of a scissor lift platform and comprising a load deck;
   load cells to carry the load deck;
   a top frame to carry the load cells;
   a base frame;
   scissor members pivotally attached to each other and joining the top frame and the base frame at opposed corners;
   double acting cylinders located at one end of the base frame and at the other end adjacent the pivotal attachment between the scissor members whereby extension of the double acting cylinders lifts the scale to its weighing position and a reaction compresses the top of the frame towards the base.

4. A weigh scale as claimed in claim 1 in which the load cells are connected together in a junction box;
   adjustable potentiometers for each load cell;
   a digital indicator electrically connected to the potentiometer to provide a weighing readout;
   electrical contacts associated with the retractable extensions and with the digital indicator;
   a push button to be pressed continuously to obtain reading on the digital indicator;
   means within the circuitry to ensure that the digital indicator will not show a reading while the retractable extensions are engaged within the housings.

5. A weigh scale as claimed in claim 1 in which the retractable extensions are double acting cylinders.

6. A weigh scale as claimed in claim 5 in which the double acting cylinders are hydraulic cylinders.

7. A weigh scale as claimed in claim 1 in the form of an electronic floor scale comprising a load receiving deck;
   a top frame below and secured to the load receiving deck;
   a base frame mounted on a base;
   the load cells, retractable extensions and housings being mounted between the base frame and the top frame.

8. An electronic floor scale as claimed in claim 7 mounted in a pit with a load receiving deck generally level with the upper edges of the pit to facilitate loading of the scale.

* * * * *